United States Patent [19]

Yasuda et al.

[11] 4,153,897

[45] May 8, 1979

[54] METHOD AND DEVICE FOR DETECTING THE SIMILARITY BETWEEN STANDARD AND UNKNOWN PATTERNS

[75] Inventors: Michio Yasuda, Koganei; Yasuaki Nakano, Hino; Hiromichi Fujisawa, Urawa; Toshihiro Hananoi, Kanagawa, all of Japan

[73] Assignee: Hitachi, Ltd., Japan

[21] Appl. No.: 815,825

[22] Filed: Jul. 14, 1977

[30] Foreign Application Priority Data

Jul. 23, 1976 [JP] Japan .................................. 51-87280

[51] Int. Cl.² ............................................ G06K 9/12
[52] U.S. Cl. ............................................ 340/146.3 Q
[58] Field of Search ............. 340/146.3 Q, 146.3 AQ, 340/146.3 E, 146.3 R, 146.3 MA; 364/819, 820

[56] References Cited

U.S. PATENT DOCUMENTS

| 3,292,149 | 12/1966 | Bourne | 340/146.3 E |
|---|---|---|---|
| 3,384,875 | 5/1968 | Bene et al. | 340/146.3 Q |
| 3,849,762 | 11/1974 | Fujimoto et al. | 340/146.3 Q |
| 3,905,018 | 9/1975 | Gray | 340/146.3 Q |

OTHER PUBLICATIONS

Cutaia, "Multilevel Character Recognition System" *IBM Tech. Disclosure Bulletin,* vol. 13, No. 12, May, 1971. pp. 3739-3742.

*Primary Examiner*—Leo H. Boudreau
*Attorney, Agent, or Firm*—Craig & Antonelli

[57] ABSTRACT

In a pattern recognition device for recognizing an unknown pattern in accordance with the magnitude of the similarities between the unknown pattern and a plurality of standard patterns, the similarity between the unknown pattern and one of the standard patterns is detected as follows.

Similarities are detected at first in respective shifting conditions where the unknown and standard patterns are relatively shifted from each other over the first limited extent, including the condition without the shift. The maximum value of these similarities is then detected. The similarities are further detected in respective shifting conditions where the unknown and standard patterns are relatively shifted from each other over the second extend larger than the first limited extent, when the shifting condition which gave the maximum value is that without relative shift.

11 Claims, 25 Drawing Figures

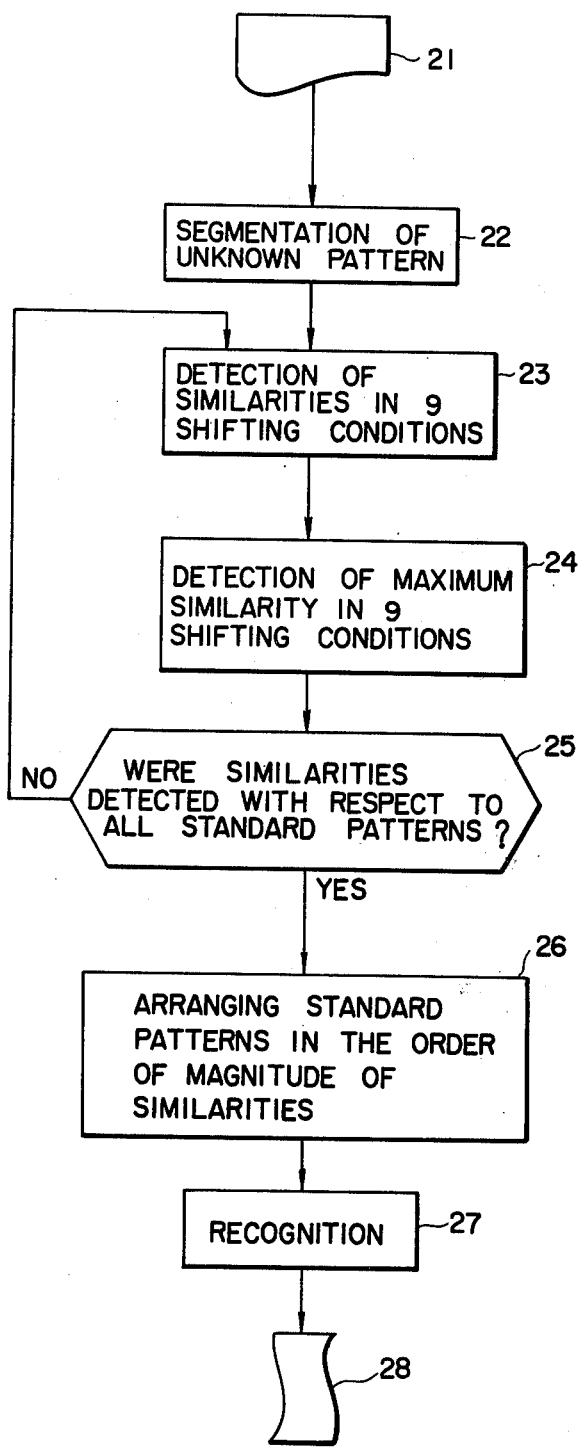

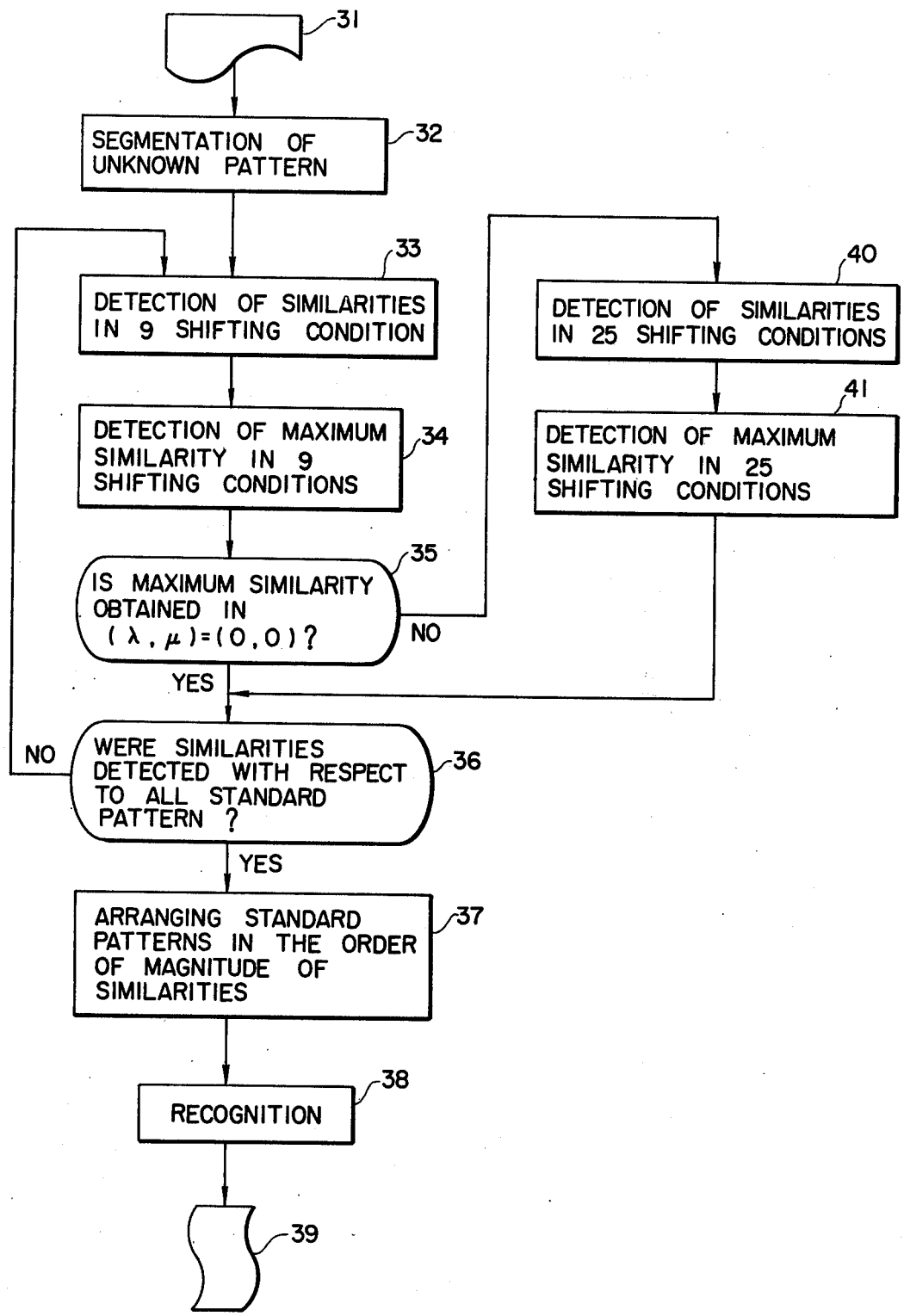

571~576 : MULTIPLEX CIRCUIT

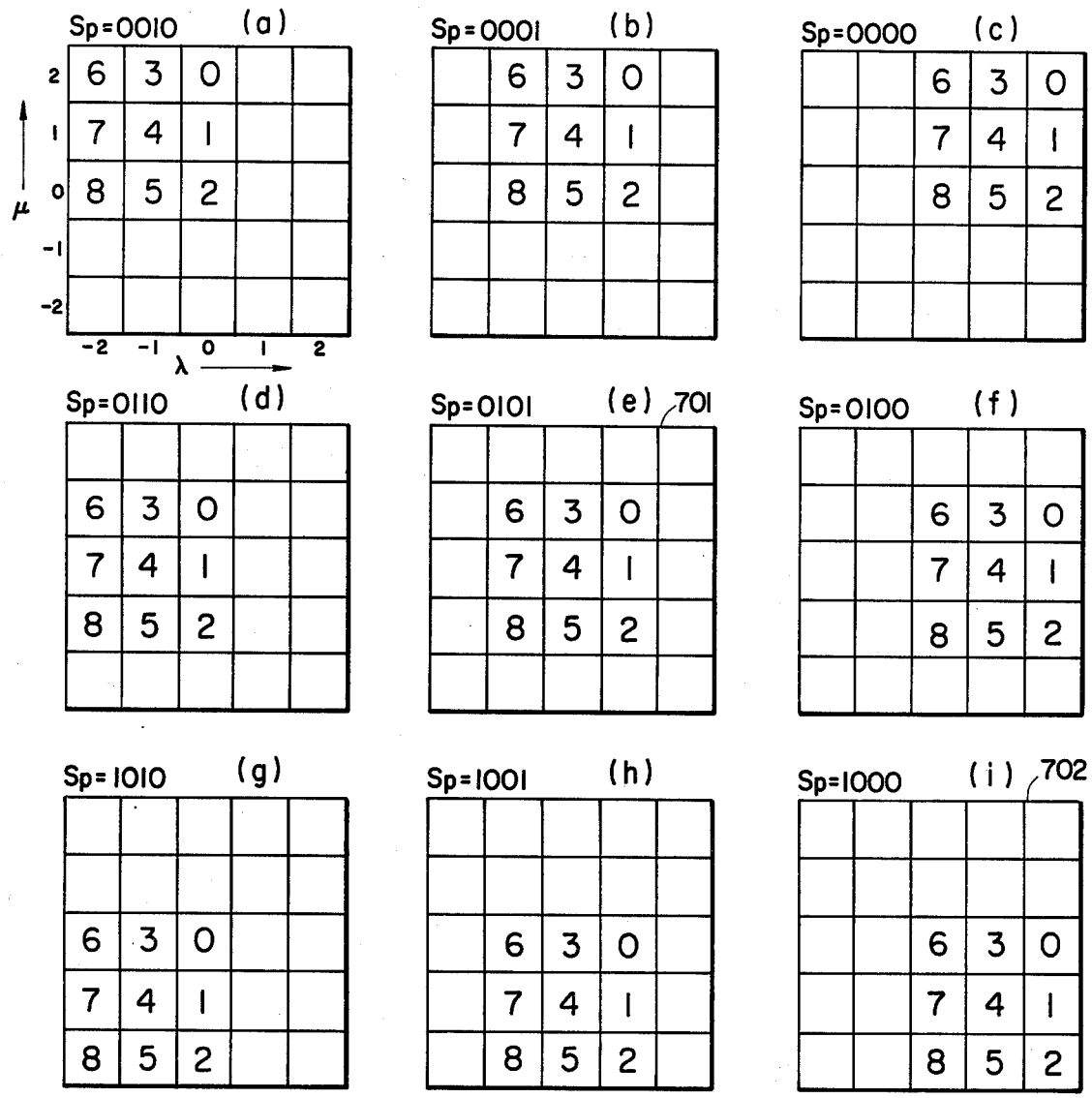
FIG. 24
FIG. 23
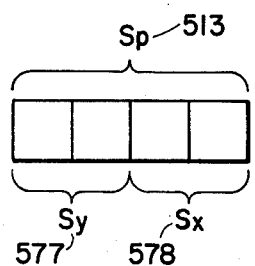
FIG. 25
| R | S |
|---|---|
| 0 | 0000 |
| 1 | 0100 |
| 2 | 1000 |
| 3 | 0001 |
| 4 | (0101) |
| 5 | 1001 |
| 6 | 0010 |
| 7 | 0110 |
| 8 | 1010 |

METHOD AND DEVICE FOR DETECTING THE SIMILARITY BETWEEN STANDARD AND UNKNOWN PATTERNS

BACKGROUND OF THE INVENTION

The present invention relates to a method and a device for detecting the similarity between an unknown pattern and a standard pattern in a pattern recognition device.

In a character recognition device for recognizing printed characters such as numerals, alphabets, chinese characters, symbols etc., a similarity detection scheme is well-known.

That is, an unknown pattern to be recognized in segmented from digital patterns obtained by the scanning of a document, and there is then detected the similarity between the segmented unknown pattern and each of a plurality of standard patterns.

A category corresponding to a standard pattern having the largest similarity is selected as the recognition result of the unknown pattern.

However, in a case where the segmented unknown pattern and a standard pattern are displaced in position relative to each other due to some deformation of the unknown pattern, the similarity detected by shifting the positions of these patterns may be larger than that detected by a non-shifting of pattern positions.

Thus, in the prior art, the unknown pattern and the standard pattern are relatively shifted in position over a desired extend and the similarities in respective shifting conditions are detected, thereby determining the maximum value of the similarities as the similarity between the unknown pattern and the standard pattern.

However, in such a prior art recognition device, if both patterns are relatively shifted over a small extent, for example, by one picture cell in eight directions, it is impossible to recognize very accurately the unknown pattern. Thus, a larger shifting extent is desired. However, if both patterns are relatively shifted over a larger extent, for example, by two picture cells in eight directions, processing time for the similarity detection becomes longer or the hardware cost increases.

SUMMARY OF THE INVENTION

One object of the present invention is to provide a method for similarity detection by which the similarities in respective shifting conditions are accurately detected in a short processing time.

Another object of the present invention is to provide a similarily detecting device which can be constructed with a simple structure.

In order to achieve such objects, the present invention is characterized by providing a similarity detection method and device in which the similarities between an unknown pattern and a standard pattern are detected over a limited extent of shifting conditions and the similarities therebetween are then detected over a broader extent of shifting conditions only when the maximum value of the similarities detected over the first limited extent is larger than the similarlity detected at the non-shifting condition.

BRIEF DESCRIPTION OF THE DRAWINGS

FIG. 6 is a flow chart for explaining a prior art similarity detection method.

FIGS. 7 through 11 are diagrams showing examples of percentages of the similarities obtained by relative shifting of the unknown and standard patterns, and the fundamental concept of the similarity detection method according to the present invention.

FIGS. 12 and 13 are flow charts illustrating respective embodiments of the similarity detection method according to the present invention.

FIG. 23 is a diagram showing an example of the constitution of a positional shift parameter.

FIG. 24 is a diagram showing examples of shift conditions corresponding to the respective positional shift parameters.

FIGZ. 25 is a table for the positional shift parameter for the second stage.

DETAILED DESCRIPTION OF A PRIOR ART

Figure 1:
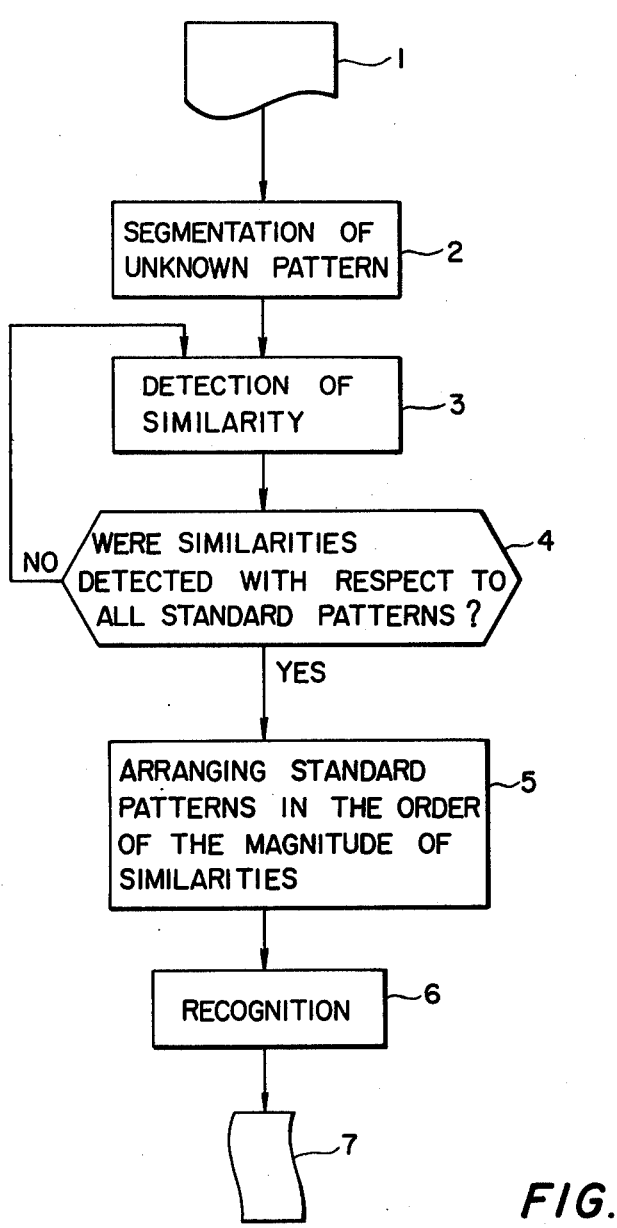
FIG. 1 is a flow chart illustrative of a recognition scheme for a character recognition device.

FIG. 1 is a flow chart illustrating a recognition scheme for a character recognition device.

In FIG. 1, at the step 1, a document on which characters or patterns are printed, is scanned by a photo-electric converter and the patterns on the document are converted into electric signals or digital patterns and are transferred to a recognition processing device. At the step 2, an unknown pattern to be recognized is segmented from among the patterns transferred from the photoelectric converter, in the recognition processing device. That is, after the size and the position of the unknown pattern on the document are extracted, the segmented pattern is transferred for the succeeding processing.

At steps 3 and 4, the similarity between the unknown pattern and each of a plurality of previously stored standard patterns is detected on the basis of predetermined methods described hereinafter. At the step 5, category numbers are rearranged in the order of the magnitude of the similarities between the respective standard patterns and the unknown pattern.

At the step 6, a category of a standard pattern having the maximum similarity is selected as the recognition result of the unknown pattern. A prior art method for similarity detection is concretely described below.

Figure 2:
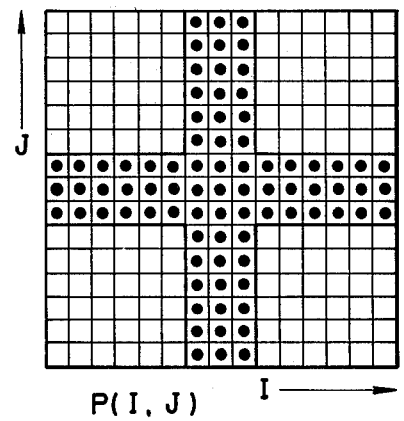
FIGS. 2 and 3 are diagrams showing examples of a pattern.

FIG. 2 shows an example of a pattern representing symbol "+".

In order to process by means of the recognition processing device, the pattern is converted electrically into 15-by-15 square picture cells each of which has a value corresponding to the optical reflection factor of a small region of paper. The picture cell having a black dot in FIGS. 2 and 3 indicates that the cell corresponds to a black portion of the pattern and the picture cell represented by a blank corresponds to a white portion of the pattern.

The electrically converted pattern or digital pattern as shown in FIG. 2 can be expressed mathematically as follows.

$$P(I, J) = P_{I,J} \quad (1)$$
$$\begin{cases} 0 \leq P_{I,J} \leq 1 \\ 1 \leq I \leq N, 1 \leq J \leq M \end{cases}$$

where I and J are the horizontal and vertical coordinates of the pattern, respectively.

$P_{I,J}$ represents the optical absorption factor around the point (I, J) in the segmented pattern. For example, $P_{I,J}$ for a white portion if "0" and $P_{I,J}$ for a black portion is "1". When the optical absorption factor in between the two extreme optical absorption factors, that is values corresponding to real white and real black portions, $P_{I,J}$ has the intermediate value between "0" and "1". However, in such a case, $P_{I,J}$ is converted to "0" or "1" by the thresholding with a proper value.

Denoting a standard pattern and an unknown pattern by P(I, J) and X(I, J), respectively, the similarity $S_{lx}$ between P(I, J) and X(I, J) is defined by the following equation (2).

$$S_{lx} = \frac{S'_{lx}}{\sqrt{S_{ll} \cdot S_{xx}}}, \quad (2)$$

where $S'_{lx}$, $S_{ll}$ and $S_{xx}$ are defined as follows:

$$\begin{cases} S'_{lx} = \sum_{I,J} P(I,J) \cdot X(I,J) \\ S_{ll} = \sum_{I,J} P^2(I,J) \\ S_{xx} = \sum_{I,J} X^2(I,J). \end{cases} \quad (3)$$

In general, the similarity $S_{lx}$ defined by the equation (2) holds for the relation:

$$0 \leq S_{lx} \leq 1 \quad (4)$$

Figure 3:
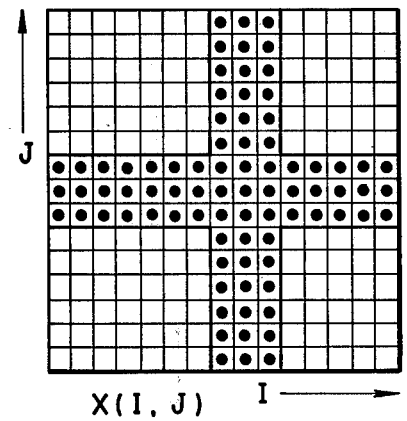

FIG. 3 shows a deformed pattern of symbol "+". Assuming that patterns of FIGS. 2 and 3 correspond to the standard pattern P(I, J) and the unknown pattern X(I, J), respectively, the similarity $S_{lx}$ obtained by the equation (2) takes a value smaller than one. That is, when any point of the unknown pattern X(I, J) has a different value other than that of corresponding point of the standard pattern P(I, J), the similarity $S_{lx}$ becomes smaller than one. Thus, when the unknown and standard patterns are relatively displaced in position from each other due to some cause, the similarity $S_{lx}$ takes the values smaller than one.

Figure 4:
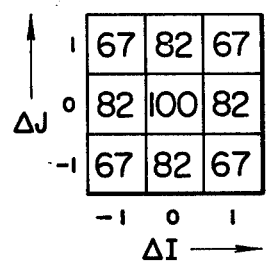
FIG. 4 is a diagram showing examples of the similarities expressed in percent that are obtained by relative shifting of the unknown and stardard patterns.

FIG. 4 shows the magnitude of the similarity (100 $\times S_{lx}$) in a case where the unknown pattern X(I, J) is P(I, +ΔI, J +ΔJ), that is, where the unknown pattern obtained is by shifting the standard pattern P(I, J) by ΔI and ΔJ in line and row directions, respectively. In FIG. 4, the case where each of ΔI and ΔJ is 1, 0 or −1. Such displacement of the relative position between an unknown pattern and a standard pattern often happens when the unknown pattern is deformed as shown in FIG. 3.

The similarity between the patterns shown in FIGS. 2 and 3 obtained by shifting the unknown pattern by one picture cell the left direction in the drawing is larger than the similarity value without the shift.

Therefore, a method is known in which in lieu of the similarity $S_{lx}$, there is adopted the maximum value $S^*_{lx}$ of the similarities obtained by shifting the relative position of the standard pattern and the unknown pattern over a predetermined extent.

The similarity $S^*_{lx}$ is calculated according to the following equations.

$$S^*_{lx} = \frac{S^*_{lxo}}{\sqrt{S_{ll} \cdot S_{xx}}} \quad (5)$$

$$\begin{cases} S^*_{Slxo} = \max_{\lambda,\mu} S_{lx}(\lambda,\mu) \\ S_{lx}(\lambda,\mu) = \sum_{I,J} P(I + \lambda, J + \mu) \cdot X(I,J) \end{cases} \quad (6)$$

Figure 5:
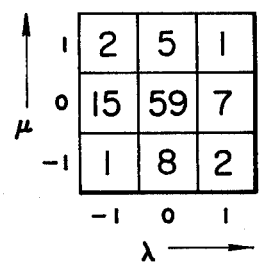
FIG. 5 is a diagram showing an example of detection rates maximum value in respective shifting conditions.

FIG. 5 shown an example of the probability (in percent) that the maximum value will be detected in the respective relative position. (λ, μ).

As seen from FIG. 5, the probability that the similarity $S^*_{lx}$ obtained by the equation (5) coincides with the similarity $S_{lx}$ obtained by the equation 2) is about 60% and that of the case where $S^*_{lx}$ does not coincide with $S_{lx}$ is about 40%.

It is evident that the cases where $S^*_{lx}$ does not coincide with $S_{lx}$ can not be neglected, although these probabilities vary depending on the printing quality and the character group to However, recognized. However, in the case where $S^*_{lx}$ is adopted in lieu of $S_{lx}$, the processing time for the similarity detection is substantially increased.

For example, in a case where the similarities are detected over an extent where each of λ and μ is 1, 0 and −1, the processing time becomes 9 times of that for the similarity $S_{lx}$. Furthermore, in a case where the similarities are detected over an extent where each of λ and μ is 2, 1, 0, −1 and −2, the processing time therefor is 25 times that for the similarity $S_{lx}$. Therefore, the processing time for the similarity detection becomes longer, or the scale of the hardware becomes larger by introducing a parallel processing scheme.

In a prior art, therefore, a method is used in which the similarities are calculated over nine relative positions where each of λ and μ is 1, 0 and −1.

FIG. 6 shows a flow chart of such a prior art method. At the step 22, an unknown pattern is extracted by segmenting the pattern on a document scanned at the step 21. At the step 23, the similarities corresponding 9 9 combinations of shifting values λ and μ are calculated. At the step 24, the maximum value among the nine similarity values is adopted as the similarity between the unknown pattern and a standard pattern. At the step 25, it is determined whether or not the similarities are calculated with respect to all of the standard patterns. At the step 26, category numbers are rearranged in the order of the magnitude of each similarity, and, at the step 27, the category number having the maximum similarity is selected as the recognition result of the unknown pattern.

However, it is a fact that, as shown in FIG. 5, forty percent of the similarity $S^*_{lx}$ cannot be obtained without a shift, i.e. $(\lambda, \mu) = (0, 0)$ and there is also a case where the accurate similarity cannot be detected even over the extent shown in FIG. 5. Therefore, in a case where the correct recognition rate is required to be more than, for example, 99.9%, the above fact cannot be ignored.

Although it is not impossible to detect the similarities over a greater extent, the processing time becomes enormous, thereby remarkably increasing the processing time or the hardware mass. Therefore, such a detection scheme is not practical.

DETAILED DESCRIPTION OF THE PREFERRED EMBODIMENTS

A fundamental concept of a similarity detection method according to the present invention is described hereinafter.

FIGS. 7 through 11 represents the similarity values for combinations of values of $\lambda$ and $\mu$.

FIG. 7 shows a case where an unknown pattern completely coincides with the standard pattern. In such a case, the similarity at the relative position $(\lambda, \mu) = (0, 0)$ is 100%, marked by a square in FIG. 7.

FIG. 8 shows a case where the unknown pattern is slightly deformed. In this case, although the maximum similarity is obtained at $(\lambda, \mu) = (0, 0)$, the similarity is 97% of the maximum.

FIG. 9 shows a case where the unknown pattern is displaced in position from the standard pattern. The maximum similarity is obtained at $(\lambda, \mu) = (1, 0)$ as marked by a circle.

FIG. 10 shows a case where the unknown pattern is further displaced in position from the standard pattern. Here, the maximum similarity is obtained at $(\lambda, \mu) = (2, 0)$, that is, the condition shifted by two picture cells from $(\lambda, \mu) = (0, 0)$.

In order to deal with such the case, in a prior art, it was necessary to detect the similarities in 25 combinations of shifting values $\lambda$ and $\mu$ ($\lambda, \mu = 2, 1, 0, -1,$ and $-2$) and to select the maximum similarity from among 25 similarities.

According to the present invention, the similarities are first detected over a limited extent where each of $\lambda$ and $\mu$ is 1, 0 and $-1$ and, only when the maximum similarity is obtained at $(\lambda, \mu) \neq (0, 0)$, are similarities then detected over a broader extent. Therefore, the processing amount according to the present invention corresponds, at the most, to 40% of that due to the prior art.

FIG. 12 is a flow chart illustrating an embodiment of a similarity detection scheme according to the present invention.

In FIG. 12, steps 31 through 34 correspond to steps 21 through 24 of FIG. 6. That is, the similarities between a segmented unknown pattern and a standard pattern are detected in 9 combinations of the shifting values $\lambda$ and $\mu$ (that is, $\lambda, \mu = 1, 0$ and $-1$) and the maximum similarity is selected from these similarities. At the step 35, it is determined whether or not the maximum similarity was obtained at the relative position $(\lambda, \mu) = (0, 0)$.

When the maximum similarity is obtained at positions $(\lambda, \mu) \neq (0, 0)$, the similarities are detected over a broader extent, that is, in 25 combinations of values $\lambda$ and $\mu$ (that is, $\lambda, \mu = 2, 1, 0, -1$ and $-2$) at the step 40. At the step 41, the maximum similarity is selected among the similarities detected at the step 40. According to above-described embodiment, since the similarities are detected over the broader extent only when the maximum similarity is detected at $(\lambda, \mu) \neq (0, 0)$, the processing amount for the similarity detection is remarkably reduced.

Steps 36 through 39 of FIG. 12 correspond to steps 25 through 28 of FIG. 6, respectively.

In above-described embodiment, when the similarities are detected over the broader extent, the similarities may be detected in 16 combinations in addition to the 9 combinations previously detected.

Figure 13:
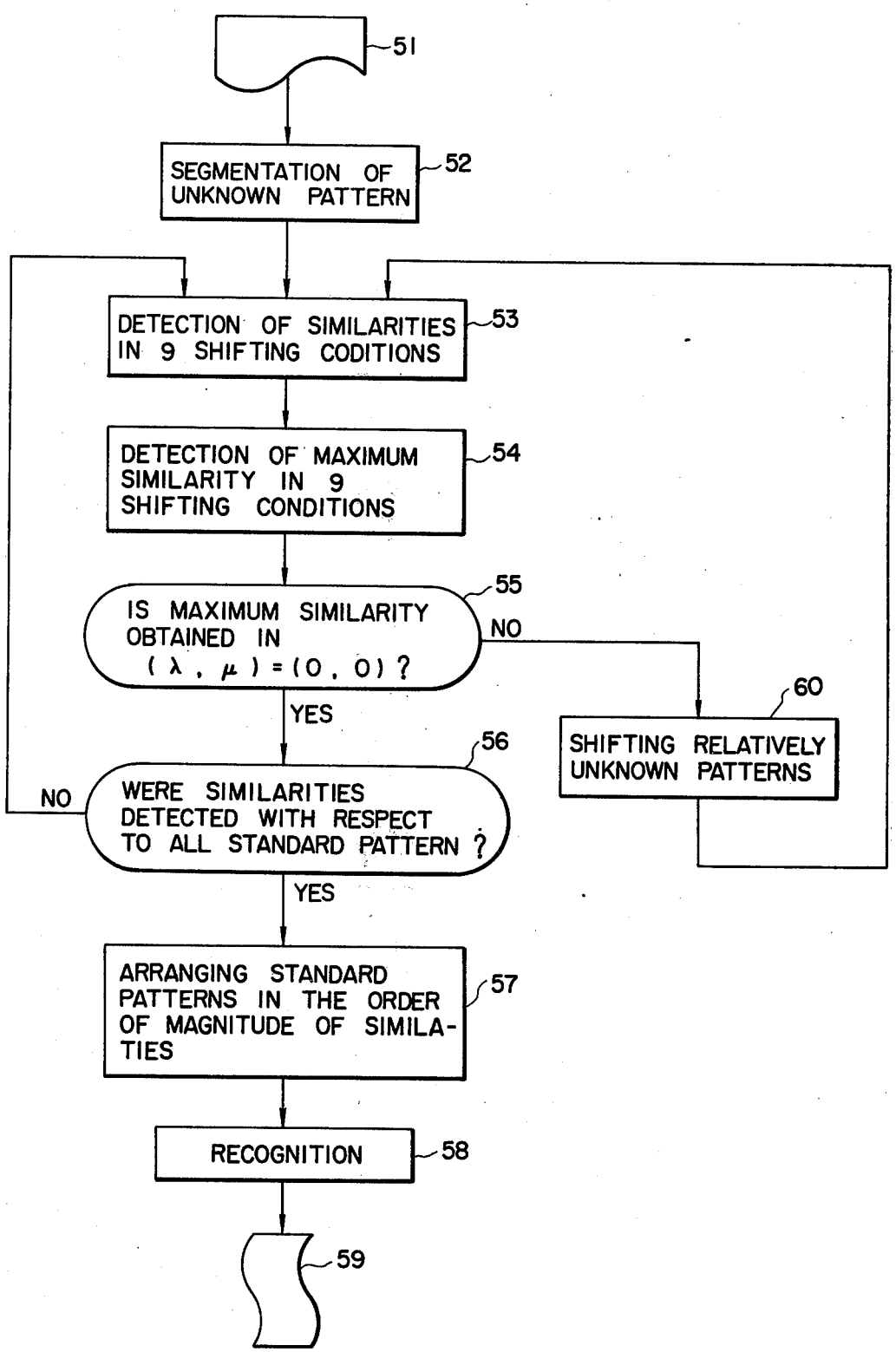

FIG. 13 is a flow chart illustrating another embodiment of a similarity detection method according to the present invention.

In FIG. 13, steps 51 through 55 correspond to steps 31 through 35 of FIG. 12, respectively.

In the case of FIG. 13, when the maximum similarity is detected under the condition $(\lambda, \mu) \neq (0, 0)$, there are stored the maximum similarity and shifting condition in which the maximum similarity is obtained. At the step 60, the unknown pattern and the standard pattern are relatively shifted by one picture cell in the direction of the stored shifting condition. The similarities between the relatively shifted unknown and standard patterns are then detected at step 53 and the maximum similarity is obtained at step 54 as the similarity corresponding to the standard pattern.

For example, in FIG. 10, the similarities are detected over the first limited extent where each of $\lambda$ and $\mu$ is 1, 0 and $-1$ and the maximum similarity (87%) is obtained at $(\lambda, \mu) = (1, 0)$. Thereupon, the unknown pattern and the standard pattern are relatively shifted by one picture cell so that the center of the relative positions of both patterns is displaced as $(\lambda, \mu) = (1, 0)$. The similarities are then detected over an extent where $\lambda$ is 0, 1 and 2 and $\mu$ is 1, 0 and $-1$ and the maximum similarity (97%) is obtained at $(\lambda, \mu) = (2, 0)$. It should be noted that the similarities may be detected over the extent where $\lambda$ is 2 and $\mu$ is 1, 0 and $-1$ because the similarities have been detected at a previous step over an extent where $\lambda$ and 1 and $\mu$ is 1, 0 and $-1$.

In this case, the processing amount for the similarity detection corresponds to 12 combinations of $\lambda$ and $\mu$. Furthermore, the similarities are calculated over a broader extent only when the maximum similarity is obtained at $(\lambda, \mu) \neq (0, 0)$, so that the processing amount is remarkably reduced in comparison with a case where the similarities are detected in 25 combinations of $\lambda$ and $\mu$.

If the maximum similarity is obtained at $(\lambda, \mu) \neq (1, 0)$ when the similarities are detected over an extent where $\lambda$ is 0, 1 and 2 and $\mu$ is 1, 0 and $-1$, the similarities may be further calculated over an extent where $\lambda$ is 1, 2 and 3 and $\mu$ is 1, 0 and $-1$ as shown in FIG. 11. In such a case, steps 53 to 55 and 60 of FIG. 13 are repeated.

There is a rare case where the maximum value of the similarities is given in a plurality of shifting conditions. In order to solve this ambiguity, the unknown pattern and the standard pattern may be relatively shifted to the directions of the respective shifting conditions. Another means to solve this ambiguity is to shift the patterns relatively to the direction of either one of the shifting conditions. Although, in the above-described embodiments, the number of combinations of $\lambda$ and $\mu$ are specific ones, the present invention does not limit the number thereof to these specific combinations.

In the foregoing embodiments, the similarity between two-dimensional patterns was dealt with. However, the similarities between one dimensional or three dimensional patterns can be also detected similarly according to the present invention.

Figure 14:
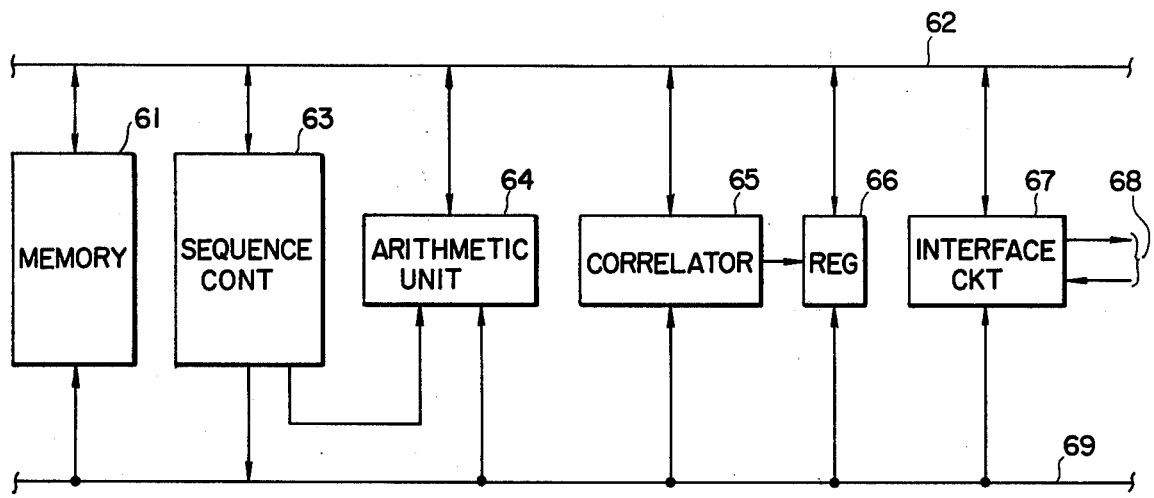
FIG. 14 is a diagram showing an embodiment of a similarity detection device according to the present invention.

FIG. 14 shows an embodiment of a similarity detection device realizing the similarity detection method according to the present invention.

In FIG. 14, eliminated are mechanical portions for holding and transporting the document on which the patterns to be recognized are printed and the photo-electric converter for converting the patterns on the document into electric signals. Only the recognition processing device is shown in FIG. 14.

Numeral 61 designates memory device for storing a recognition program, a control program, and standard and unknown patterns, etc., numeral 62 a data bus for transferring data signals, numerals 63 a sequence controller which executes the reaction and control programs controlling the recognition processing device, numeral 64 an arithmetic logic unit, numeral 65 a correlator, numeral 66 a group of registers to store the correlation values corresponding to the respective shifting conditions, numeral 67 an interface circuit, numeral 68 signal lines for transferring data between the interface circuit 67 and an input/output device such as a photo-electric converter, and numeral 69 a control bus for transferring control signals.

In order to recognize an unknown pattern, the patterns on the document are first converted into electric signals by the photo-electric converter and are stored in the memory device 61. An unknown pattern is segmented from among the pattern stored in the memory device 61 by executing the recognition program using the sequence controller 63 and the arithmetic logic unit 64 and is transferred to the correlator 65. In the correlator 65, the correlation values corresponding to the respective shifting conditions are calculated. These correlation value are stored in the register 66.

Furthermore, by means of the controller 63 and the arithmetic logic unit 64, the maximum value of the similarities corresponding to the correlation values is selected and it is determined whether or not the maximum similarity is obtained at $(\lambda, \mu) = (0, 0)$, on the basis of the information from the registers 66.

When the maximum similarity is obtained under the condition $(\lambda\mu) \neq (0, 0)$, the patterns are relatively shifted and the correlation values are again calculated by the correlator 65.

Using the arithmetic logic unit 64, the maximum similarities for the respective standard patterns are detected and a standard pattern having the maximum value of the maximum similarities is selected as the recognition result of the unknown pattern.

Figure 15:
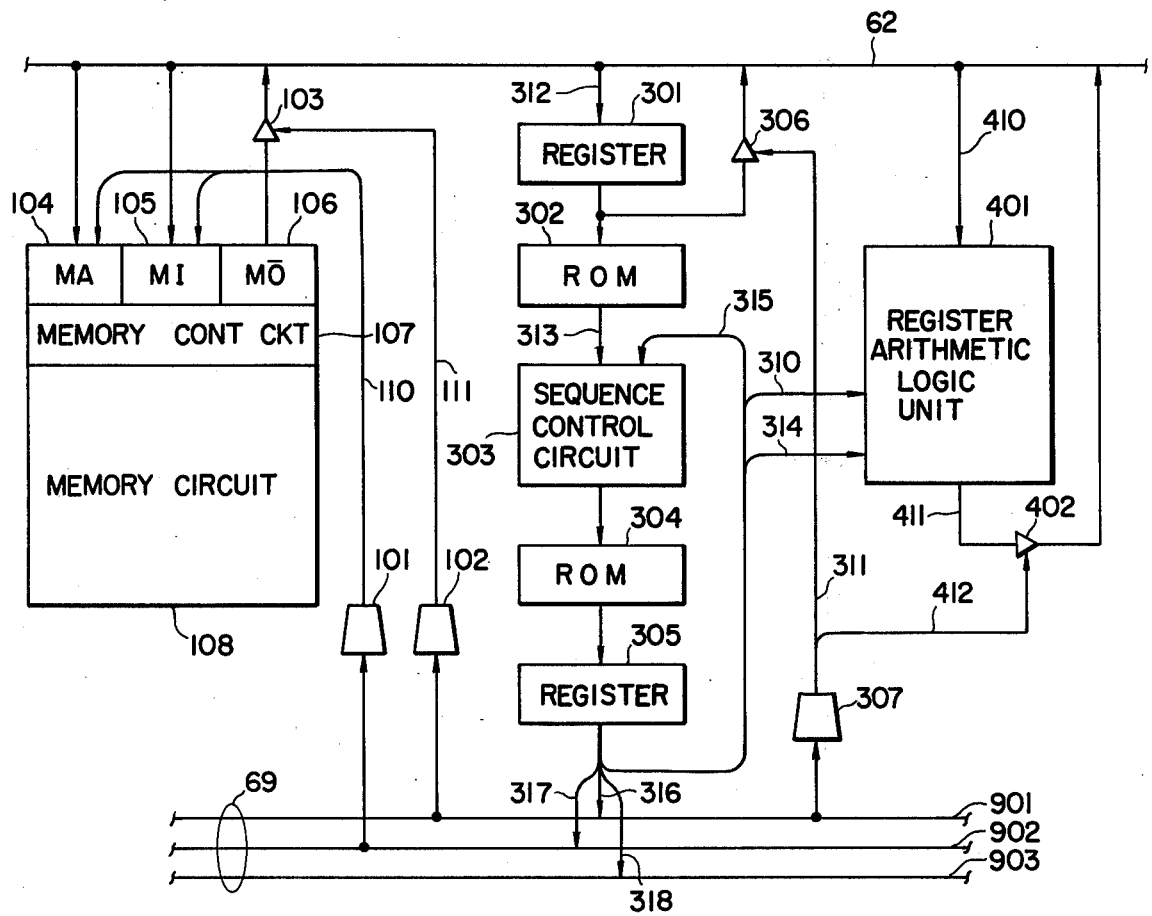
FIG. 15 is a diagram showing one embodiment of a part of FIG. 14.

FIG. 15 shows an embodiment of concrete construction of the memory device 61, the sequence controller 63 and the arithmetic logic unit 64 in FIG. 14.

The memory device 61 consists of listener address decoder 101, a talker address decoder 102, a tri-state bus buffer 103, a memory address register 104, a write-in data register 105, a read-out data register 106, a memory control logic 107 and memory banks 108 having memory cells.

The sequence controller 63 is composed of an instruction register 301, an address mapping read-only-memory (ROM) 302, a sequence control logic 303, a control read-only-memory (ROM) 304, a micro instruction register 305 and tri-state bus buffer 306. The arithmetic logic unit 64 is constructed by a register arithmetic logic unit (RALU) 401 and a tri-state bus buffer 402, and the control bus 69 comprises a talker address bus 901, a listener address bus 902 and a control pulse bus 903.

In general, a central processing unit (CPU) of a general purpose digital computer is formed by the memory device 61, the sequence controller 63 and the arithmetic logic unit 64.

In the embodiment of FIG. 15, an emulation method using a micro program (stored in the control ROM 304) is adopted. This emulation method is described below.

The RALU 401 has a multiple of general purpose registers divided between a program counter PC, an accumulator AC, an extended accumulator EC, an index register IX, a working register, etc.

An instruction of a program stored in memory banks 108 is executed as follows. The contents of the program counter PC in the RALU 401 are transferred through a signal line 411, the bus buffer 402 and the data bus 62 to the memory address register 104 and an instruction of the program is read out in response to the address in the register 104 and is transferred through the data bus 62 and a signal line 312 to the instruction register 301. The instruction code of the instruction stored in the register 301 is inputted into the mapping ROM 302 and the top address of a micro program for the execution of the instruction is transferred from the ROM 302 to the sequence control logic 303 through a signal line 313. Micro instructions starting with the top address are sequentially read out from the control ROM 304 by the sequence control logic 303 and are latched by the micro instruction register 305. One micro instruction is divided into a plurality of sub-fields and the respective sub-fields are transferred to signal lines 315, 310, 314, 316, 317 and 318 as the micro jump address, the direct data, the instruction for RALU 401, the talker address, the listener address and the control pulse, respectively.

In accordance with a train of micro instructions read out from the control ROM 304, the operand column of the instruction stored in read-out the register 301 is transferred through the bus buffer 306 and a signal line 410 to the RALU 401 is decoded by the RALU 401. When the corresponding operand is stored in the memory circuit 108, an address of the operand is calculated by the RALU 401. This operand address is transferred through the signal line 411, the bus buffer 402 and, the data bus 62 to the memory address register 104 and the operand stored in the memory circuit 108 is read out into the readout data register 106. The operand in the register 106 is transferred through the bus buffer 103, the data bus 62 and the signal line 410 to the RALU 401, and is then processed by the RALU 401.

In order to store the operation results of the RALU 401 in the memory circuit 108, a memory address is calculated by the RALU 401 and is transferred to the memory address register 104. At the same time, a datum to be stored is transferred from the RALU 401 to the write-in data register 105. Thus, this data is stored in the memory circuit 108 in accordance with the memory address in the register 104.

Steps for processing the pattern on the document are described hereinafter.

These steps are stored in the form of a program memory banks 108. The controller 63 and the arithmetic logic unit 64 constituting the CPU execute an instruction of a specific address of the program.

At first the document is fed to a photo-electric converter portion by the control program. The fed document is stopped mechanically by detecting reference marks and then character patterns on one line of the document are converted into electric signals or the digital pattern. A block of data of the digital pattern is transferred through the interface circuit 67 and the data bus 62 to memory device 61, by the control program. A character pattern is segmented after the termination of the photo-electric conversion, by a recognition program.

Figure 16:
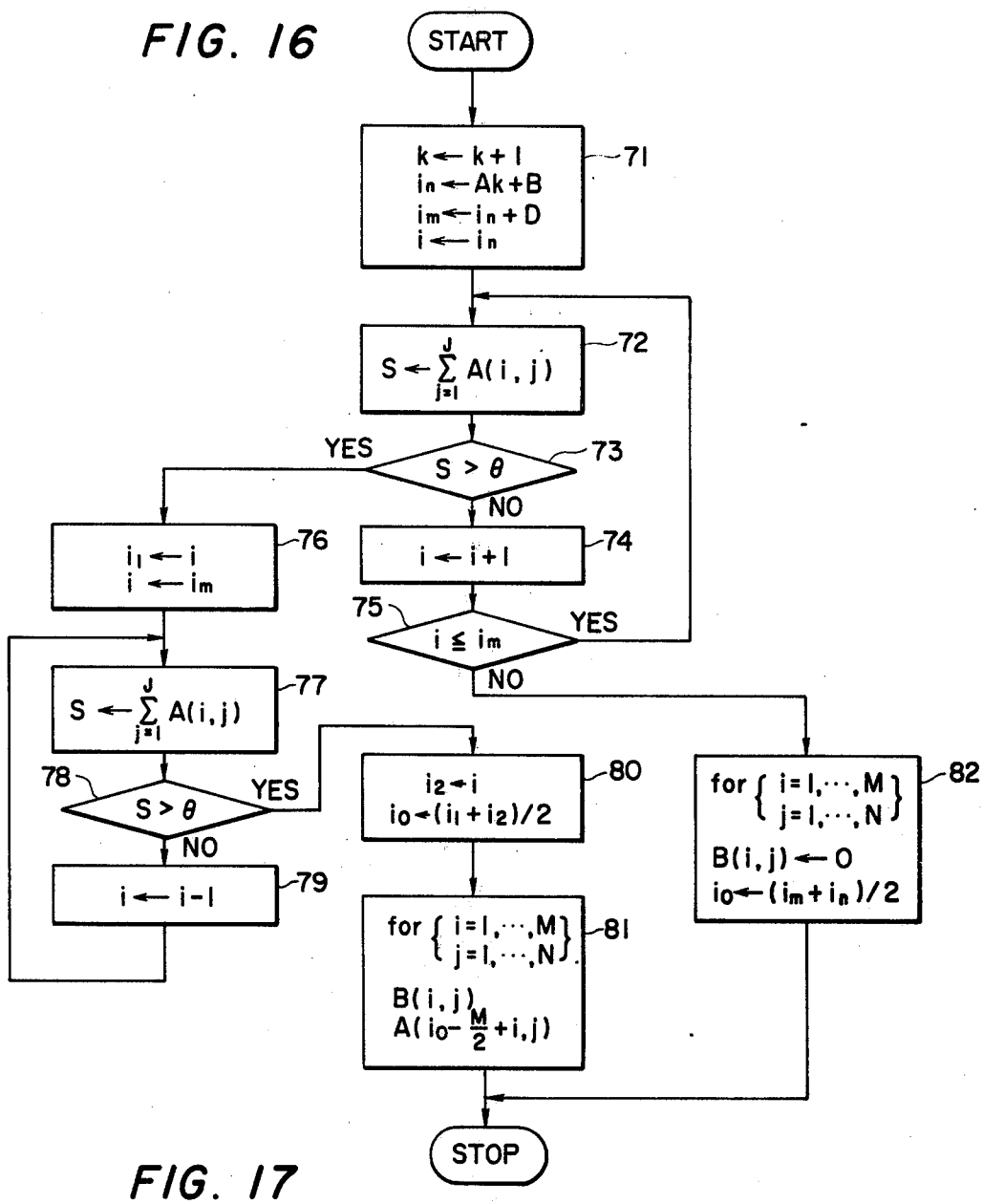
FIG. 16 is a flow chart illustrating a pattern segmentation scheme.

FIG. 16 shows a flow chart of an example of the segmentation routine in the recognition program.

Figure 17:
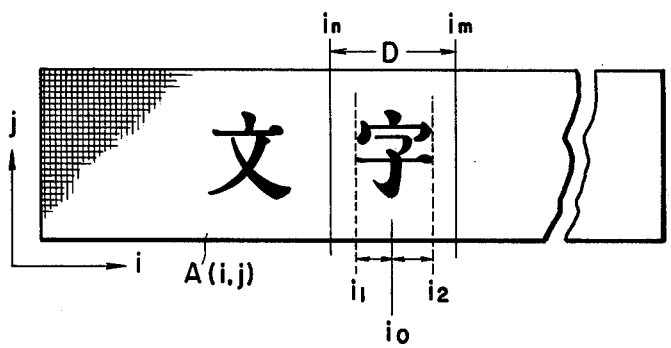
FIG. 17 is a diagram showing an example of scanned patterns on a document.

The digital pattern for one character line is represented by A (i, j) as shown in FIG. 17. In A (i, j), i and j indicate positions in a line direction and a row direction perpendicular to the line direction, respectively.

In FIG. 16, at the step 71, the initial values for the positional parameters in the line direction are present. In the step 71, k designates the character address in the line segmented at the last stage, A an average interval between adjacent printed characters, B an initial value of character position on the line, D a value which is a slightly larger than the width of the character. Therefore, $i_n$ corresponds to an initial position for character searching and $i_m$, corresponds to a final position therefor.

At the step 72, calculated is the integral value s of the mesh patterns A (i, j) in the row direction at each position i starting from the initial position $i_m$. At the step 73, it is determined whether or not the integral value S is larger than a threshold value $\theta$. When S is smaller than or equal to $\theta$, the searching position i is increased by one at the step 74. When the increased position i is known to be left of the final position $i_m$ in the drawing at step 75, the steps 72 and 73 are repeated.

Figure 18:
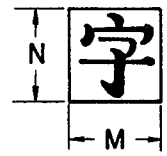
FIG. 18 is a diagram showing an example of a segmented pattern.

When the integral value S is detected to be greater than the threshold value at step 73, it is decided that the position i has arrived at the left most point of the character patterns, that is, the value $i_1$ representing the left most point is set to the value i at step 76. Then, the position i is set to the final position $i_m$ at step 76. At steps 77 through 80, the right most point, $i_2$, of the character is searched by moving the position i starting from the final position $i_m$ to a left direction in such a manner as that of steps 72 through 76. The center coordinate $i_o$ of the character is calculated as the average value of $i_1$ and $i_2$ at step 80. After the center point $i_o$ has been detected, a character pattern having the size of MXN such as shown in FIG. 18, is extracted and transferred to the buffer area B (i, j) of the memory device 61.

On the other hand, when the position i goes beyond the final position $i_m$, it is decided that no character is present. Thus, a blank is stored in the buffer area B (i, j) and the center coordinate $i_o$ is replaced by the average value of $i_n$ and $i_m$ at step 82. The center coordinate $i_o$ is outputted as the positional information of the character. Although the algorithm to detect the left and right ends of the character was presented as in FIG. 16, the upper most and lower most ends thereof can be detected in the similar manner. A parameter k is set to zero every time when the scanning of one character line is started by the control program.

Figure 19:
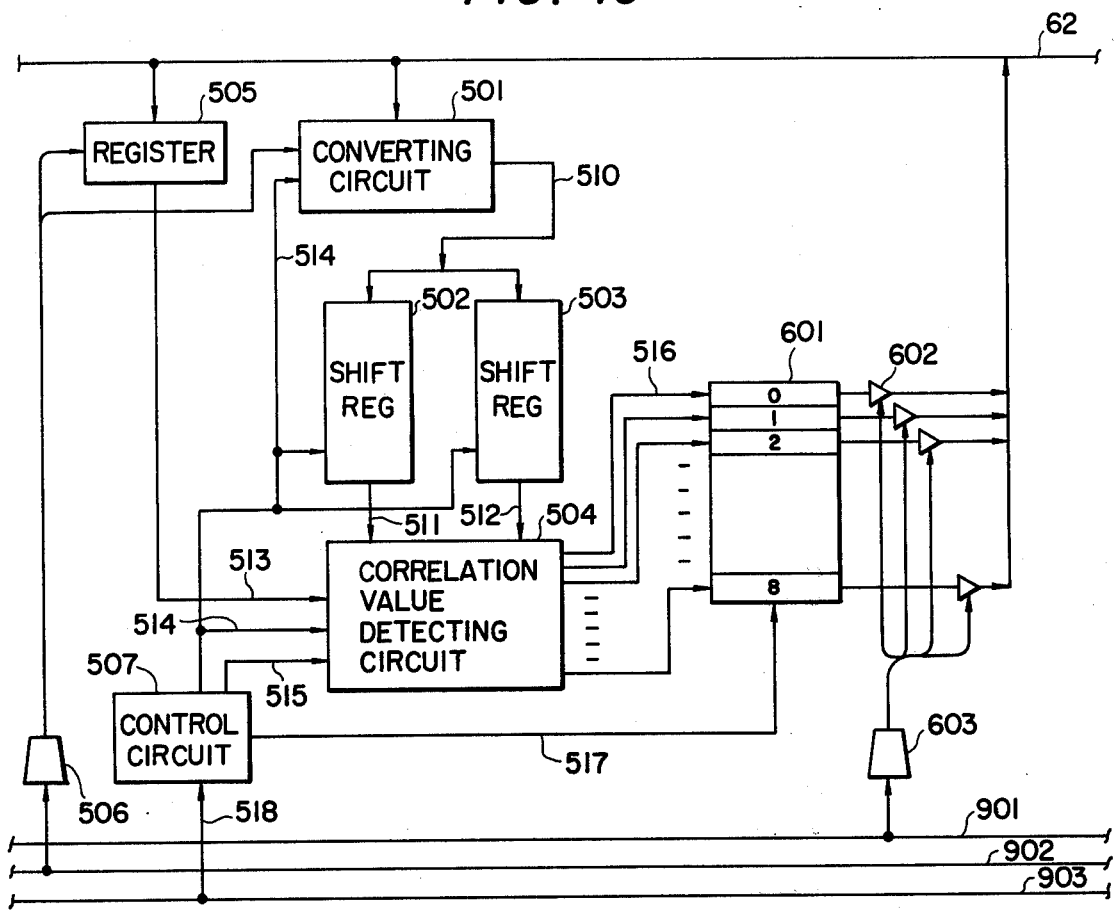
FIG. 19 is a diagram showing one embodiment of another part of FIG. 14.

When the recognition program completes segmentation of one line of characters, it starts the recognition process, that is the, calculation of the similarity between one of the unknown patterns so segmented and each standard pattern in the memory. The detailed description of the similarity calculation process follows. FIG. 19 shows an embodiment of the correlator 65 and the registers 66 shown in FIG. 14.

In FIG. 19, the correlator 65 comprises a serial-parallel conversion logic 501, shift registers 502 and 503, correlation unit 504, a positional shift parameter register 505, a listener address decoder 506 and control circuit 507. The register block 66 has nine registers 601, nine tri-state bus buffers 602 and a talker address decoder 603.

Figure 20:
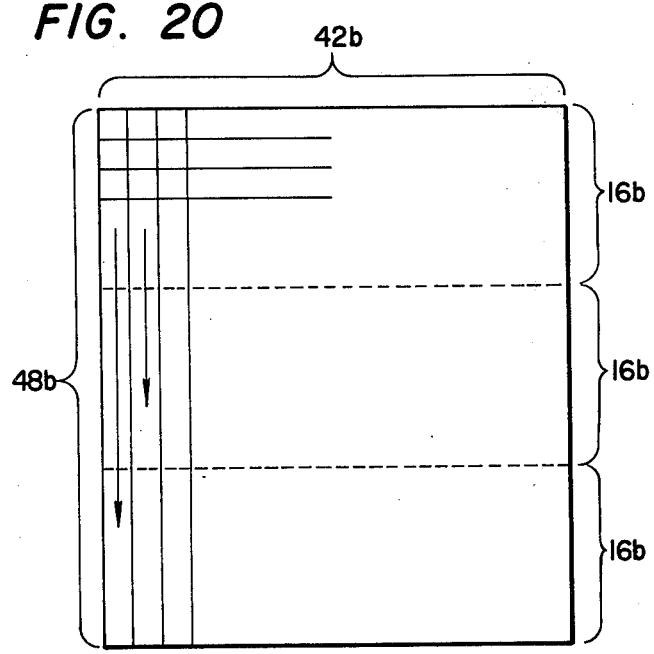
FIG. 20 is a diagram showing an example of a mesh pattern stored in the memory.

It is presumed that a character pattern is a rectangular mesh pattern of 48 by 42 picture cells (1 bit/p.cell) such as shown in FIG. 20 and is stored in memory device 61 in the order of the arrows. Each word of memory has 16 bits.

When such a character pattern is a standard pattern or an unknown pattern, it is serially transferred through the serial parallel conversion logic 501 and a signal line 510 to the shift register 502 or 503, respectively. Although one row of the pattern stored in memory device 61 is constituted by 48 bits, two bits of zero value are separately added to the start and end terminals of each row by the serial parallel conversion logic 501 for position shifting compensation. Thus, each row of the pattern stored on the registers 502 and 503 has 52 bits. In the correlation unit 504, the numeration $S_{lx}'$ of the right side of the equation (2) is calculated under nine shifting conditions. The calculated results are stored in the respective registers 601.

Figure 21:
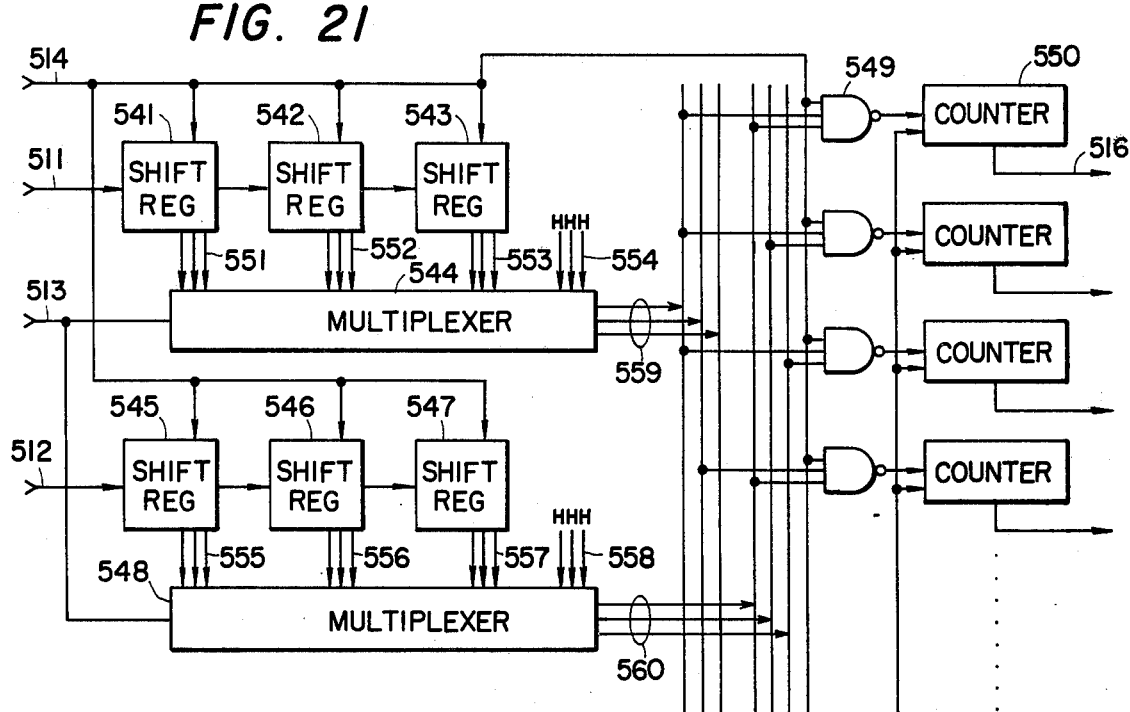
FIG. 21 is a diagram showing an embodiment of a part of FIG. 19.

FIG. 21 shows an embodiment of the correlation unit 504 in FIG. 19.

In FIG. 21, the correlation unit 504 has 8-bit shift registers 541 and 545, 52-bit shift registers 542, 543, 546 and 547, multiplexers 544 and 548, nine AND gates 549, and 9 12-bit counters 550.

When the standard pattern and the unknown pattern are stored in the registers 502 and 503, respectively, a reset signal is outputted on a signal line 515 from the control circuit 507 and the counters 550 are reset to zero. Furthermore, clock pulses from the control circuit 507 are supplied through a signal line 514 to the shift registers 541 through 543 and 545 through 547, and the contents of these shift registers are shifted by one bit every clock pulse. Three bits of the end side of each of the registers 541 through 543 are supplied through signal lines 551 through 553 to the multiplexer 544 and three bits of the end side of each of the registers 545 through 547 are supplied through signal lines 555 to 557 to the multiplexer 548. Signals from the registers 541 through 543 and 545 through 547 are selectively applied to the AND gates 549 in response to a signal on a signal line 513 from the register 505. Therefore, the correlation values $S_{lx}$ corresponding to 9 shifting conditions specified by the signal on the signal line 513 are obtained in the respective counters 550. The contents of the counters are transferred through signal lines 516 to the registers 601. A desired positional shift parameter is previously set into the register 505.

Figure 22:
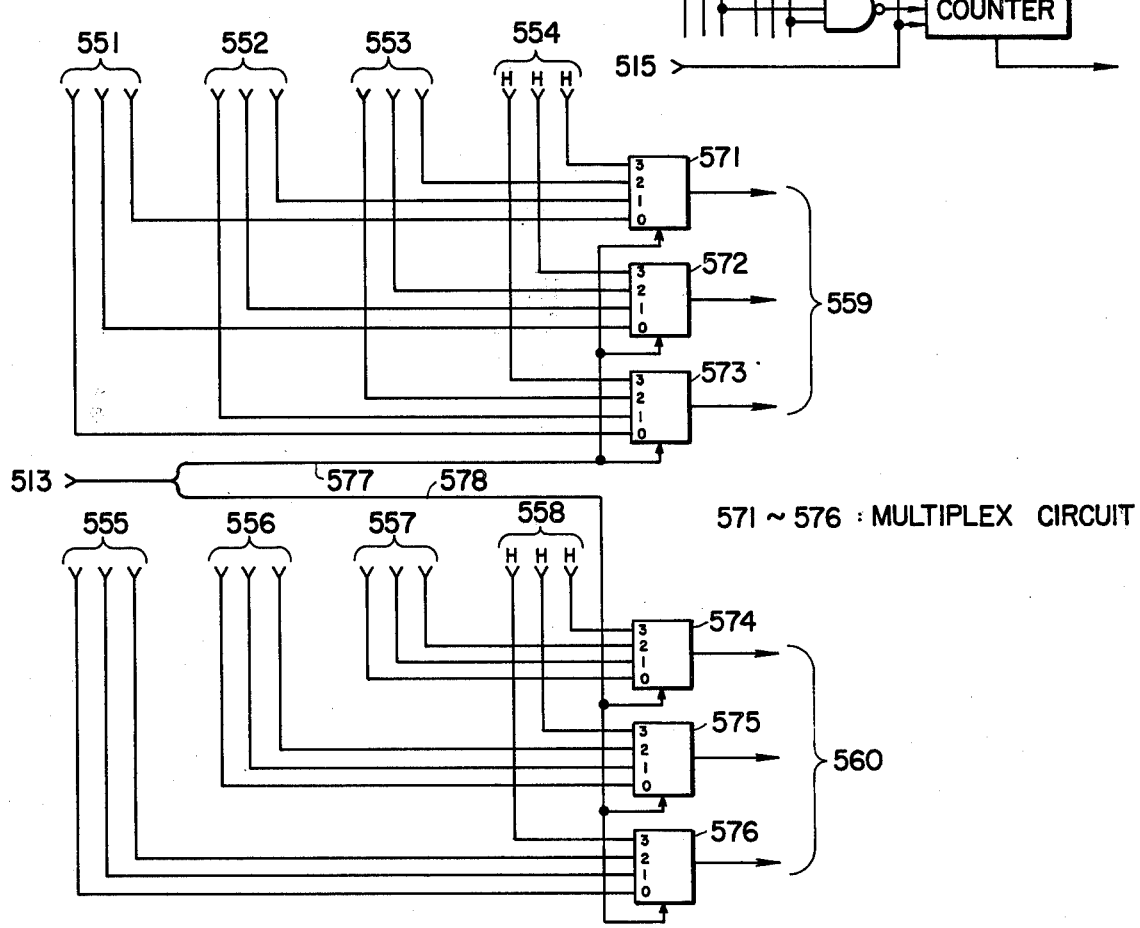
FIG. 22 is a diagram showing an embodiment of a part of FIG. 21.

FIG. 22 shows an embodiment of the multiplexers 544 and 548 of FIG. 21. The multiplexer block 544 is constructed by three multiplexer circuits 571 through 573 and the multiplexer 548 is constructed by multiplexer circuits 574 through 576.

The positional shift parameter $S_p$ on the signal line 513 is a signal of 4 bits as shown in FIG. 23. Two bits $S_y$ therein are applied through a signal line 577 to the circuits 571 through 573 and the remaining 2 bits $S_x$ are applied through a signal line 578 to the circuits 574 through 576.

Shown in (a) through (i) of FIG. 24 are the relative positional shifting conditions corresponding to the respective values of the positional shift parameter $S_p$. For example, if $S_p=0101$, there are detected the similarities corresponding to the relative shifting conditions such as show in (e). Numerals 0 through 8 in (a) to (i) represent the register number in the nine registers 601 which hold the result. Therefore, at $S_p=0101$, the correlation value $S_{lx}'$ corresponding to a condition of non-shifting between the unknown pattern and the standard pattern, that is $(\lambda, \mu)=(0, 0)$ is stored in number 4 register in the registers 601. In this case, values, $S_{lx}'$, corresponding to conditions where $(\lambda, \mu)$ is (1, 1), (1, 0) or (1, −1) are stored in number 0, 1 or 2 registers 601.

There is hereinafter described the operations of the similarity detection device for executing the process shown in FIG. 13.

An unknown pattern segmented at the step 52 is transferred through the converting circuit 501 and the signal line 510 to the register 503. At the step 53, a standard pattern is transferred from the memory device 61 to the register 502 and $S_p=0101$ is set into the positional shift parameter register 505. At the same time, the correlation detection process is started. After a predetermined time, the correlation values $l_x$ corresponding to 9 shifting conditions are stored in the registers 601. The contents of the registers 601 are transferred through the bus buffers 602 and the data bus 62 to the memory device 61 of CPU, and are stored therein. At the step 54, the maximum value of the stored values $S_{1x}'$ is searched by the controller 63 and the arithmetic logic unit 64. If the maximum value is obtained in the number 4 of registers 601, it is decided that the maximum value is obtained at $(\lambda, \mu)=(0, 0)$. If the maximum value is not obtained in number 4 register, the positional shift parameter $S_p$ for the next stage of the similarity detection is obtained referring to the table shown in FIG. 25. For example, if the maximum value was stored in the number 6 register, the next parameter $S_p$ should be 0010. The second correlation detection process is executed in response to this parameter. After the second correlation detection process, the maximum correlation value is selected.

After the maximum correlation value is obtained, it is necessary to calculate the similarity value by dividing the maximum correlation value by the denominator of the right side of the equation (2). Coefficients $S_{ll}$ and $S_{xx}$ for the standard and unknown patterns are previously or timely calculated as follows. In order to calculate the coefficient $S_{ll}$, a standard pattern is stored in the register 502 and $S_p=1101$ is set into the register 505. Therefore, "1" signals H on signal lines 554 are outputted from the multiplexer circuits 571 through 573. The coefficient $S_{ll}$ is, thus, obtained in the number 4 register 601 after a predetermined time.

On the other hand, in order to detect the coefficient $S_{xx}$, an unknown pattern is stored in the register 503 and $S_p=0111$ is set into the register 505. Therefore, "1" signals H on the signal lines 558 are outputted from the multiplexer circuits 574 to 576. The coefficient $S_{xx}$ is thus obtained in the number 4 registers 601.

The similarity between the standard pattern and the unknown pattern is obtained according to the equation (5) on the basis of the thus obtained $S_{lx}$, $S_{ll}$ and $S_{xx}$.

The similarities are detected with respect to a plurality of standard patterns as described above and the maximum value of these similarities are detected, thereby selecting a standard pattern.

We claim:

1. A method for detecting the similarities between an unknown pattern signal and a plurality of standard pattern signals in a pattern recognition system having first means for converting an unknown pattern into a corresponding electrical unknown pattern signal, second means for storing said unknown pattern signal, third means for storing a plurality of standard pattern signals, fourth means for shifting a pattern signal, fifth means for detecting a similarity between two pattern signals, and sixth means for performing logical operations on said similarities detected by said fifth means, said sixth means including means for comparing the similarities detected by said fifth means, said method comprising:

a first step of detecting first stage similarities between said unknown pattern signal and a selected one of said standard pattern signals in said fifth means after sending said unknown pattern signal and said selected standard pattern signal to said fifth means from said second and third means, respectively, said first step including a step of detecting the similarity between the unknown pattern signal and the selected standard pattern signal without a relative shift from each other and steps of detecting the respective similarities between the unknown pattern signal and the selected standard pattern signal after said unknown pattern signal and said selected standard pattern signal are relatively shifted from each other with respective first shifting values within a first extent in said fourth means;

a second step of detecting the maximum value of said first stage similarities between the unknown pattern signal and the selected standard pattern signal;

a third step of detecting second stage similarities between said unknown pattern signal and said selected standard pattern signal after said unknown pattern signal and said selected standard pattern are relatively shifted from each other in said fourth means with respective second shifting values within a second extent which is larger than said first extent, only when said maximum value of the first stage similarities does not correspond to said similarity between the unknown pattern signal and the selected standard pattern signal without said relative shift;

a fourth step of detecting the maximum value of said second stage similarities in said sixth means; and a fifth step of supplying the maximum value of the first stage similarities as the similarity between the unknown pattern signal and the selected standard pattern signal when the maximum value of the first stage similarities corresponds to the similarity therebetween without said relative shift and supplying the maximum value of the second stage similarities as the similarity between the unknown pattern signal and the selected standard pattern signal when the maximum value of the first stage similarities does not correspond to the similarity therebetween without said relative shift.

2. A similarity detecting method according to claim 1, wherein said first step comprises a sixth step of detecting the first similarities between the unknown pattern signal and the selected standard pattern signal in respective shifting conditions where each of the first shift values of $\lambda$ and $\mu$ in line and row directions is 1, 0 or −1; and said third step comprises a seventh step of detecting the second stage similarities between the unknown pattern signal and the selected standard pattern signal in at least a part of the respective shifting conditions where each of the second shifting values of and in the line and row directions is 2, 1, 0, −1, −2 only when the first shifting values corresponding to the maximum of the first stage similarities do not satisfy the conditions $\lambda=0$ and $\mu=0$.

3. A similarity detecting method according to claim 2, wherein said seventh step comprises a step of detecting the second stage similarities between the unknown and selected standard pattern signals in respective shifting conditions where the second shifting values of $\lambda$ and $\mu$ in the line and row directions are the values obtained by adding 1, 0 and −1 to M and N, respectively, where M and N are the first shifting values in the line and row corresponding to the maximum value of the first similarities.

4. A similarity detecting method according to claim 1, in which said third step includes a step of relatively shifting the unknown pattern signal and the selected standard pattern signal in said fourth means with said respective second shifting values which are determined in accordance with the first shifting value corresponding to the maximum value of the first stage similarities between the shifted unknown and standard patterns in said fifth means.

5. A similarity detecting method according to claim 1, wherein said third step is only performed when the maximum value of the first stage similarities between the unknown pattern signal and the selected standard pattern signal is larger than the similarity therebetween without said relative shift.

6. A similarity detecting device according to claim 5, which further includes means for inputting the unknown pattern to store it in said first means.

7. A similarity detecting device according to claim 5, which further includes means for temporarily storing the results obtained by said third means.

8. A method for detecting the similarity between a standard pattern and an unknown pattern in a pattern recognition system comprising:
a first step of segmenting the unknown pattern;
a second step of detecting the first stage similarities between the standard pattern and the segmented unknown pattern without a relative shift from each other and with respective shifting conditions where the unknown pattern and the standard pattern are relatively shifted from each other over a first limited extent;
a third step of detecting the maximum value of the first similarities;
a fourth step of detecting the second stage similarities therebetween in respective shifting conditions where the unknown pattern and the standard pattern are relatively shifted from each other over a second extent which is larger than the first extent when a shifting condition corresponding to the maximum value of the first stage similarities with the relative shifts does not correspond to the similarity between the unknown pattern and the standard pattern without the relative shift; and
a fifth step of detecting the maximum value of the second stage similarities as the similarity therebetween.

9. A similarity detecting method according to claim 8, in which said fourth step includes a sixth step of relatively shifting the unknown pattern and the standard pattern in accordance with the shifting condition corresponding to the maximum value of the first stage similarities and a seventh step of detecting the second stage similarities between the shifted unknown and standard patterns in respective shifting conditions where the shifted unknown and standard patterns are further relatively shifted from each other over a second limited extent.

10. A device for detecting the similarlity between a standard pattern and an unknown pattern in a pattern recognition system comprising:
first means for storing the standard and unknown pattern signals;
second means connected to said first means for relatively shifting the standard and unknown pattern signals from each other over a first extent and over a second extent which is larger than the first extent;
third means connected to said first and second means for detecting the first stage similarities between the standard pattern and the unknown pattern without a relative shift from each other and with relative shifts from each other over the first extent in said second means, and for detecting the second stage similarities therebetween with relative shifts from each other over the second extent which is larger than the first extent in said second means;
fourth means connected to said third means for detecting the maximum value of the first stage similarities and the maximum value of the second stage similarities;
fifth means connected to said third and fourth means for controlling said third and fourth means so that said third means detects the second stage similarities and said fourth means detects the maximum value of the second stage similarities only when said maximum value of the first stage similarities with the relative shifts from each other does not correspond to the first stage similarity without a relative shift from each other; and
sixth means connected to said fourth and fifth means for providing, as the similarity between the unknown and standard pattern signals, the maximum value of the first stage similarities, when the maximum value of the first stage similarities with the relative shifts corresponds to the first stage similarity without a relative shift and the second stage similarities when the maximum value of the first stage similarities with the relative shifts does not correspond to the first stage similarity without a relative shift.

11. A device for detecting similarity according to claim 10, wherein the fifth means controls the third and fourth means to detect the second stage similarities and the maximum value of the second stage similarities only when the maximum value of the first stage similarities is larger than the first stage similarity without said relative shift.

* * * * *